United States Patent Office 2,889,601
Patented June 9, 1959

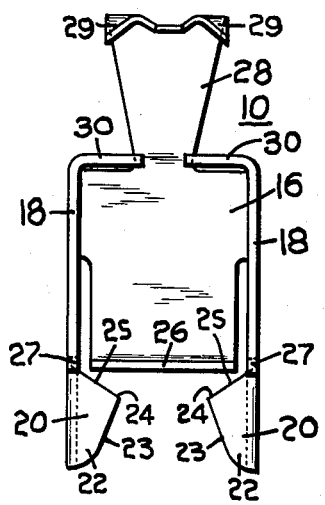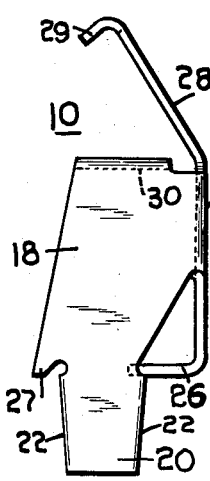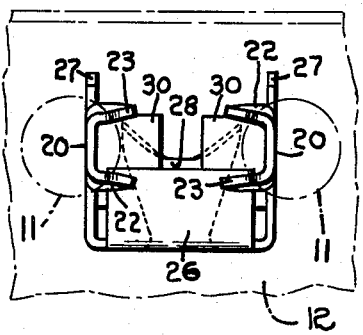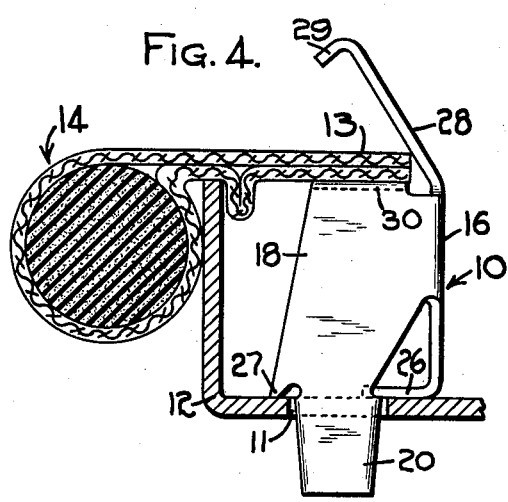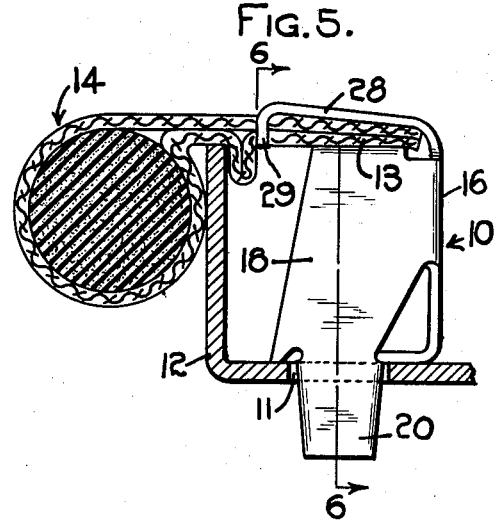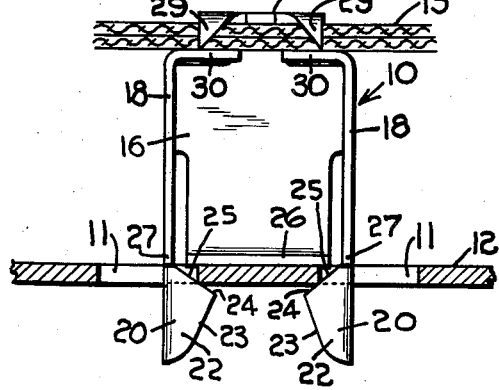
INVENTOR:
CLARENCE W. COCHRAN,
BY Robert E Ross
ATTORNEY.

2,889,601

FASTENING DEVICE

Clarence W. Cochran, Belmont, Mass., assignor to United-Carr Fastener Corporation, Boston, Mass., a corporation of Delaware Application November 21, 1956, Serial No. 623,737

3 Claims. (Cl. 24—73)

This invention relates generally to fastening devices and has particular reference to a fastener adapted to retain a fibrous or plastic layer in position on an apertured support.

In the construction of automobiles, appliances and the like, it is necessary to attach various types of fibrous or plastic material to an apertured support panel. For example, a material known as wind cord is fitted about the doors of an automobile to provide a water-tight seal. In many cases, such attachment must be made without access to the rear of the panel, and it is usually desirable that the fastener be capable of assembly into a blind opening.

The object of this invention is to provide a fastener to suit the above requirements and is particularly adapted so as to be removable for repairs to the inner door.

A further object of this invention is to provide a fastener for the purpose described which is so constructed as to lock in place by snap fastener legs.

A further object of this invention is to provide a fastening device which is suitable to be attached to the fibrous or plastic material without the use of special tools.

Other objects of the invention will, in part, be obvious, and will, in part, appear hereinafter.

In the drawing:

Fig. 1 is a view in front elevation of a fastening device embodying the features of the invention;

Fig. 2 is a view of the fastener of Fig. 1 as seen from the right side;

Fig. 3 is a bottom plan view of Fig. 1;

Fig. 4 is a view in section of the fastener of Fig. 1 assembled in a support in position to retain a wind cord therein;

Fig. 5 is a view similar to Fig. 4 in which the fastener is in the closed position engaging the wind cord; and Fig. 6 is a view in section on line 6—6 of Fig. 5.

Referring to the drawing, there is illustrated a fastener 10, which is adapted for snap fastener engagement with spaced apertures 11 in a support 12 for the purpose of retaining a plastic or fiber layer in position, particularly a flange 13 of a wind cord 14.

In the illustrated embodiment, the fastener 10 is formed of a single piece of material such as sheet metal and is formed to provide a back 16, a pair of wing portions 18 joined to the upper portion of the opposite side edges of the back, and extending forwardly therefrom, and a pair of panel-engaging legs 20 projecting downwardly from the lower edge of the wings. The legs 20 are provided with edge portions 22 which are bent to extend generally perpendicular to the wings and are provided with snap fastener portions comprising a tapered forward portion 23, leading to a shoulder 24 and an inclined panel-engaging surface 25 disposed above the shoulder.

To provide means to limit the distance the legs 20 can pass through the panel apertures, a rear stop 26 is provided in the bottom edge of the back for abutting the panel rearwardly of the legs, and a downwardly projecting forward stop 27 is provided on the wings forwardly of the legs.

To provide means for engaging the flange 13 of the wind cord, a deformable arm 28 extends upwardly from the upper edge of the back and is inclined forwardly, with downwardly projecting tangs 29 disposed on the end thereof.

To cooperate with the arm 26 in gripping the flange 13, the upper ends of the wing portions are provided with portions 30 which extend inwardly toward each other beneath the arm 28.

Such fastening devices are adapted to be positioned at spaced interval along the length of the panel and to engage and retain a length of wind cord in a predetermined position. The fasteners are assembled with the panel by simply snapping the legs into the appropriate apertures. The stop member 26 rearwardly of the arms and the stop member 27 forwardly of the arms position the legs axially in the panel apertures so that the inclined surfaces 25 engage the panel edge, tending to draw the fastener tightly against the panel.

After assembly of the fasteners, the wind cord flange 13 may be positioned in each fastener between the arm 26 and the portions 30. The arm 26 may then be deformed downwardly so that the flange is gripped between the arm 26 and said portions 30, with the tangs 29 digging into the flange.

Such deformation of the arm may be conveniently accomplished with a single blow of a hammer, and in this case the stop members 26 and 27 on each side of the legs transfer the force of the blow to the panel, so that the engagement of the legs with the panel is not affected.

The illustrated fastener may be economically manufactured from a single piece of sheet metal, and is particularly adapted for rapid assembly line installation. Although in the illustrated embodiment the fastener is used for securing the wind cord, it may be utilized in any application where it is desired to rapidly and economically attach a fiber or plastic panel to an apertured support.

Since certain other obvious modifications may be made in the device without departing from the scope of the invention, it is intended that all matter contained herein be interpreted in an illustrative and not in a limiting sense.

I claim:

1. A fastening device for retaining a layer of fibrous material in position on an apertured support, said device being formed of resilient sheet metal and comprising a back portion, two side wing portions on the back portion having uppermost extremities extending inwardly toward each other at substantially right angles to the plane of the side wings and terminating in spaced relation forming a gap therebetween, a deformable arm extending upwardly from the back portion and being inclined forwardly over the said gap whereby the said arm may be deformed downwardly to grip a layer of fibrous material disposed above the said inwardly extending extremities, and means extending downwardly integral with the side wing portions at the opposite end from said deformable arm for engagement with the apertured support.

2. A fastening device for retaining a layer of fibrous or other flexible material in position on an apertured support comprising a flat strip of material formed into a U-shaped spacer member having material retaining means at one end thereof and snap fastener portions at the other end, said U-shaped spacer member having a back portion and wing portions forming the U-shape, the snap fastener portions provided as extensions of the wings to hold the device in position on the apertured support and the material retaining means provided as an extension of the back portion and as other extensions of the wings at the end of the spacer member opposite the snap fastener portions.

3. A fastening device for retaining a layer of fibrous material in position on an apertured support, said device being formed of sheet metal and comprising a back portion, two side wing portions on the back portion having uppermost extremities extending inwardly toward each other at substantially right angles to the plane of the side wings and terminating in spaced relation forming a gap therebetween, a deformable arm extending upwardly from the back portion and being inclined forwardly over the said gap whereby the said arm may be deformed downwardly to grip a layer of fibrous material disposed above the said inwardly extending extremities, and means extending downwardly from and integral with the device at the opposite end from said deformable arm for engagement with the apertured support.

References Cited in the file of this patent

UNITED STATES PATENTS

| | | |
|---|---|---|
| 2,191,430 | Jones | Feb. 20, 1940 |
| 2,194,855 | Jones | Mar. 26, 1940 |
| 2,551,970 | Sampson | May 8, 1951 |
| 2,644,607 | Hinkel | July 7, 1953 |